United States Patent [19]

Nielsen

[11] 4,183,980

[45] Jan. 15, 1980

[54] PERLITE FILLER COATED WITH POLYDIMETHYLSILOXANE

[75] Inventor: Richard B. Nielsen, Los Angeles, Calif.

[73] Assignee: Grefco, Inc., Bala Cynwyd, Pa.

[21] Appl. No.: 886,614

[22] Filed: Mar. 14, 1978

Related U.S. Application Data

[63] Continuation of Ser. No. 734,456, Oct. 21, 1976, abandoned.

[51] Int. Cl.² ............... C04B 31/22; C04B 31/26
[52] U.S. Cl. ................................. 427/215; 428/405; 252/378 P; 106/DIG. 2
[58] Field of Search ............... 427/214, 221, 213, 314, 427/215; 428/404, 405; 260/37.5 B, 41.15; 264/42; 252/62, 4, 378 P; 106/DIG. 2

[56] References Cited

U.S. PATENT DOCUMENTS

| 2,546,474 | 3/1951 | Peynot | 260/37.5 B |
|---|---|---|---|
| 2,559,791 | 7/1951 | Peynot | 260/37.5 B |
| 2,595,465 | 5/1962 | Keene | 427/214 X |
| 2,786,801 | 3/1957 | McKinley | 427/213 |
| 2,824,022 | 2/1958 | Sucett | 427/213 |
| 3,103,254 | 9/1963 | Stedman | 264/42 |
| 3,395,035 | 7/1968 | Strauss | 260/37.5 B |
| 3,789,050 | 1/1974 | Loricchio | 428/405 X |

FOREIGN PATENT DOCUMENTS

321502 1/1972 U.S.S.R. ............... 106/DIG. 2

*Primary Examiner*—Sam Silverberg
*Attorney, Agent, or Firm*—Brian G. Brunsvold; Stephen L. Peterson; Everett H. Murray, Jr.

[57] ABSTRACT

Expanded perlite is coated with polysiloxane, the coating dried, and subsequently strengthened by heating to form an attrition-resistant, non-porous, particulate filler suitable for inclusion in polymeric materials to reduce their bulk density.

17 Claims, No Drawings

PERLITE FILLER COATED WITH POLYDIMETHYLSILOXANE

This is a continuation of application Ser. No. 734,456, filed Oct. 21, 1976 now abandoned.

BACKGROUND OF THE INVENTION

The present invention relates to the production of low density particulate fillers suited for introduction into polymeric materials to lower the bulk density of the mixture.

Polymeric resins that are widely used in commercial products normally have relatively high densities. When such materials are used in applications where reductions of the bulk density would not detrimentally affect the mechanical properties of articles made from the resins, the density of the material is reduced. One means of reducing the density of such materials is to mix low density particles with the resin. The present invention is applicable to this technique for density reduction.

Expanded perlite is a particulate, low density material that is available in commercial quantities and at commercially viable prices. The expanded form of perlite is produced by the heat treatment of perlite ore. Perlite ore is an igneous mineral consisting primarily of silica and small amounts of alumina in a structure combined with a small percentage of water. When perlite ore is heated, generally to a temperature exceeding 1600° F., the water is abruptly vaporized and released from the mineral structure. Proper selection of the ore size, heating rate and temperature of the heat treatment will result in a final expanded product having an apparent density of approximately 6 to 15 lbs/cu ft as compared with the density of the perlite ore, about 145 to 150 lbs/cu ft. Since a typical density of a polymeric resin is about 75 lbs/cu ft, the addition of expanded particulate perlite will have a markedly favorable effect on the bulk density of a mixture of resin and particulate expanded perlite.

In practice it is difficult to achieve the reductions in density theoretically possible with additions of particulate expanded perlite because of the relatively poor mechanical properties of the expanded perlite. The process of mixing the expanded perlite particles with the plastic resin normally results in the fracture and attrition of the expanded perlite into smaller relatively high density perlite fragments.

The present invention provides an improved particle, suitable for mixing in commercial processes with polymeric materials that has a low density and sufficient strength to resist fracture and attrition during the mixing process.

The present invention provides an expanded particulate perlite coated with a cured silicon compound that is significantly superior to the properties of prior art materials.

Silicon coatings on expanded perlite particles are not unique to the present invention. In prior art techniques, silicon compounds have been applied to expanded perlite in an attempt to (1) increase the dispersion of filler in the resin, and (2) to lower the absorbency of resin into the porous structure of expanded perlite particles. None of the prior art techniques treat the silicon coating in the manner taught herein and therefore none of the prior art techniques yield the improved product that results from the practice of the present invention.

SUMMARY OF THE INVENTION

Expanded particulate perlite is coated with a silicon compound and subsequently cured to form a strong low density filler. The coating steps are accomplished by contacting the expanded particulate perlite with an emulsion of polysiloxane. The coating is then dried to a moisture content of less than 0.5% moisture. After drying, the coated particle is heated for a time and temperature sufficient to strengthen the silicon coating, thereby providing the strong attrition resistant low density particle.

In a preferred process, the expanded perlite is formed from particulate perlite ore of a size where 98% of the ore is between −170 and +1250 U.S. Standard mesh.

The preferred polysiloxane emulsion would contain polydimethylsiloxane. The polydimethylsiloxane emulsion is pre-dried to less than 0.3% moisture and then heated to a temperature of from 550° to 850° F. for 10 to 30 minutes.

The product of the present invention is a low density particulate filler material formed of discrete particles of expanded perlite. Preferably the expanded perlite has a particle size distribution in which 85% of the perlite particles are of a size between 50 and 200 U.S. Standard mesh. Each of the preferred perlite particles has a coating of polysiloxane, comprising 0.5 to 4.0 weight percent of the filler material. The coating is formed on the perlite particles by first drying an emulsion of polysiloxane on the individual particles to a moisture content of less than 0.5 weight percent. Subsequently the particles are heated where the product of the temperature in degrees Fahrenheit and the time of the heating in hours is in the range of 140 to 1,100.

The coated filler of the present invention finds particular utility and is preferably incorporated in a polymeric resin to form a lightweight composite material. Preferably the composite material contains from 2 to 50 volume percent of the coated particulate perlite.

DETAILED DESCRIPTION OF THE INVENTION

The Process

The core of the individual particles of the present invention is expanded perlite. The expanded perlite can be obtained from existing supplies of expanded perlite of the proper size or perlite ore can be expanded specifically for use in the present invention.

Where the expansion of perlite ore is intended to produce the initial particles for the present invention, the size of the perlite ore can be tailored to provide the desired expanded perlite particle size.

The perlite ore is preferably presized to a narrow particle size range of from −200 to +325 U.S. Standard mesh (less than 2% +200 and less than 35% −325) prior to expansion. While presizing the ore prior to expansion to the preferred range of sizes yields a final expanded product with an optimum size distribution, it has also been found that a satisfactory product results from expansion of perlite ore presized so that 98% of the ore is in the range of from −170 to +1250 U.S. Standard mesh. It should be obvious that while the presizing of the perlite ore is preferred, the present invention can be carried out using expanded perlite from any source, and that the expanded material can be subjected to a size classification or separation process if necessary.

It is preferred to use perlite ore that has been classified prior to expansion to yield the optimum perlite particle size, because using presized ore eliminates screening the expanded perlite. This avoids a rather cumbersome step while producing a suitable product.

The manner of expanding the perlite ore is not known to affect the product of the present invention as long as the process or apparatus used to carry out the expansion does not result in abnormal changes in the size of the final product that would affect the applicability of the quantified embodiments of the present invention.

While the present invention is applicable to any size expanded perlite particle, it is preferred that the expanded perlite particles have a particle size where at least 85 weight percent of the expanded particles are between 50 and 325 U.S. Standard mesh.

The coating of the expanded perlite comprises the application of a polysiloxane to the surface of the particles of expanded perlite. While the polysiloxanes are disclosed herein as the generic compounds to be used in the coating, it should be understood that other organosilicon compounds that will react to form polysiloxanes are also operable with the invention.

Generally a polysiloxane is written structurally as:

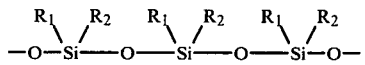

where $R_1$ and $R_2$ may be organic radicals, hydroxyl groups or other siloxanes. It is preferred that $R_1$ and $R_2$ be methyl or ethyl groups.

Particular success has been experienced in the practice of the invention with one species of polysiloxane. Emulsions containing polydimethylsiloxane having trimethyl end groups are preferred. Structurally, the preferred polysiloxane is written:

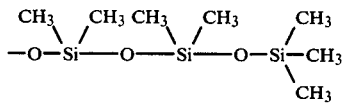

Commercial examples of the preferred polysiloxane include products sold under the trade designations: Dow Corning 36 emulsion; Union Carbide L45 emulsion; and General Electric SM 62 emulsion.

The preferred polysiloxane emulsion utilizes water as the continuous dispersing phase, however, kerosene, benzene or alcohol may also be used as the dispersant.

The emulsion containing the silicon compound can contain from 3 to 50% of the silicon compound on a total weight basis. Preferably the emulsion contains from 5 to 35 weight percent of the silicon compound and particular success has been experienced utilizing emulsions containing 20 weight percent. Emulsions within the specified ranges deposit the silicon solids uniformly on the expanded perlite particles and result in a uniform coating of polysiloxane.

Particular success in coating perlite particles has been achieved by spraying the expanded perlite with emulsion. The expanded perlite particles are coated with an amount of polysiloxane emulsion so that from 0.1 to 8.0 weight percent of the final coated particle is polysiloxane. Preferably, the coated perlite products contain from 0.5 to 4.0 weight percent polysiloxane.

After the expanded perlite particles are coated with the polysiloxane emulsion, the dispersant, usually water, is removed from the coating by a drying step where the water content is reduced.

In all drying processes used with the invention, it is imperative that agglomeration of the particulate perlite be prevented and that the dried product be free-flowing. One means of preventing such agglomeration is to suspend the coated particles in a moving stream of gas during the drying process and this is the preferred method of drying. Particular success has been experienced in drying the coated perlite in a moving air stream at elevated temperatures. Temperatures in the range of from 600° F. to 1200° F. are preferred. The coating may also be dried by external heating of the coated particulate using other means of preventing agglomeration such as agitating the particulate material within an externally heated container.

The moisture content of the coating should be reduced to at least below 0.5% by weight and preferably to 0.3% or less. When the particles are dried to the preferred moisture content, they are free flowing and have no tendency to agglomerate if subsequently heated. This facilitates both the handling and subsequent heat treatment of the product.

The drying step is followed by the heat treatment of the coating to strengthen the polysiloxane. The final heating step is primarily responsible for improving the strength of the final product and materials that have not received this final heating step are susceptible to attrition during subsequent mechanical treatment.

Where the polysiloxane is polydimethylsiloxane, the final heat treatment can be carried out at a temperature of from 550° to 850° F. It is preferred that the heat treatment of the polydimethylsiloxane be carried out at a temperature of from 650° to 750° F. for 10 to 30 minutes.

The strengthening of the polysiloxane with heat is material, time and temperature dependent. Normally the strengthening can be accomplished at lower temperatures if the time of exposure is extended, depending on the species of polysiloxane used.

The following examples illustrate specific embodiments and advantages of the invention. The invention is illustrated in terms of its density effect on mixtures of the resulting filler and polymeric materials. By measuring the density of the filler/polymer mixture, the attrition resistance and porosity of the filler is evaluated. Particulate filler that is either porous to the polymer matrix or that is fractured during mixing will have an insignificant effect on the density of the filler/polymer mixture.

EXAMPLE 1

Perlite ore sized to 1% +200 mesh, 70% −200 +325 mesh, and 29% −325 mesh was expanded using a conventional perlite expander. The expanded perlite was then coated with an emulsion to form a mixture consisting substantially of 1.2 parts by weight polydimethylsiloxane (with trimethyl end-groupings) solids, 6 parts by weight water (Dow Corning #36 emulsion), with 100 parts by weight expanded perlite. The wet, coated perlite was then dried at 800° F. in a moving air stream to less than 0.1% moisture. The dried, coated product was then heated for 30 minutes at 720° F. Samples of the uncoated perlite; the dried, coated perlite; and the dried, coated, and heat treated perlite were then mixed with Koppers K-251 polyester resin at 2400 rpm using a 2" Cowles blade. After 4.5 minutes of mixing, the density of the mixtures was measured:

| Filler | Density of Resin, Filler Mixture, lbs/ft³ |
| --- | --- |
| Presized, Expanded Ore | 62.0 |
| Presized, Expanded, Coated and Dried | 62.5 |
| Presized, Expanded, Coated, Dried and Heat Treated | 53.1 |

The above data illustrate the marked improvement imparted to the filler by the final strengthening heat treatment. The coated and dried filler material that did not receive the final heat treatment did not provide any improvement over the uncoated expanded perlite.

EXAMPLE 2

This example illustrates the temperature time relationship of the final heat treatment and illustrates that longer heating times permit use of lower curing temperatures. Perlite ore, sized and expanded as in Example 1, was coated with 1 part by weight of sodium methyl siliconate solids plus 10 parts by weight $H_2O$ (Dow Corning 772 fluid) to 100 parts by weight expanded perlite. The wet, silicon coated perlite was then placed in a circulating oven overnight at 450° F. to both dry and heat treat the coating. Resistance of the uncoated and coated perlite to breakage was then evaluated by mixing with a resin as in Example 1. Results were:

| Filler | Density of Resin, Filler Mixture, lbs/ft³ |
| --- | --- |
| Presized, Expanded | 62.6 |
| Presized, Expanded, Coated and Heat Treated | 55.5 |

The difference between the density of the two samples illustrates that the heat treatment strengthened the coated particles to a degree that mixing with the polyester did not result in any substantial attrition of the particles.

EXAMPLE 3

Dow Corning EF-43-596A silicon emulsion (a water emulsion of polydimethylsiloxane with silanol endgroups) was diluted with water and was sprayed on the perlite at the rate of 1.2 parts by weight silicon and 5.7 parts by weight water to 100 parts by weight perlite. The perlite was sized and then expanded as in Example 1. The silicon coated perlite was then dried and heat treated exactly as in Example 1. A sample of the coated perlite was also heat treated without any prior drying to less than 0.2% moisture. Results of mixing the various perlite samples with resin according to the procedure of Example 1 were:

| Filler | Density of Resin, Filler Mixture, lbs/ft³ |
| --- | --- |
| Presized, Expanded | 62.5 |
| Presized, Expanded, Coated and Dried | 59.1 |
| Presized, Expanded, Coated and Heat Treated Without Prior Drying | 58.4 |
| Presized, Expanded, Coated Dried and Heat Treated | 54.0 |

EXAMPLE 4

In order to positively illustrate that the coating of a fully heat treated polysiloxane is responsible for the improvement in density, perlite samples were prepared from perlite ore sized as described in Example 1. The expanded product was separated into aliquot portions where:

Sample A was merely expanded.

Sample B was coated with 1.2 parts silicon solids (Dow Corning 36 emulsion) plus 6 parts water to 100 parts perlite and dried in an airstream at 800° F.

Sample C was treated as Sample B and in addition, was heat treated overnight at 650° F.

Sample D was expanded and heated overnight at 650° F.

Sample E was expanded and then coated with 40 parts water to 100 parts perlite and then heat treated at 650° F. overnight.

The samples were then mixed into a resin matrix in the manner of the previous examples and the density of the mixture was measured:

| Sample | Density of Resin, Perlite Mixture lbs/ft³ |
| --- | --- |
| A | 60.7 |
| B | 63.5 |
| C | 52.1 |
| D | 60.4 |
| E | 63.2 |

Sample C, being made by the practice of the present invention, shows the marked improvement in density characteristics of utilizing a filler that is appropriately heat treated.

The Product

The product of the present invention is a coated particle having a core of expanded particulate perlite with a strengthened polysiloxane coating having utility as a low density additive material that lowers the density of materials in which it is mixed. Preferably, the product of the present invention is produced from particulate expanded perlite having a particle distribution in which 85 weight percent of the particles are between 50 and 200 U.S. Standard mesh. The final product contains from 0.1 weight percent to 8.0 weight percent of fully heat treated polysiloxane. A preferred product having uniformly excellent properties (low density, high strength, low porosity) has a composition of from 0.8 to 2.0 weight percent polysiloxane.

The particulate perlite particles of the present invention find particular utility when mixed in a matrix of polymeric resin. The composite material resulting from the mixture of the resin and the filler particles formed by the method of the present invention provides a low density composite material having predictable density and mechanical characteristics due to the inclusion of the filler material which is not fractured or altered by the mechanics of mixing. Preferably, the composite mixtures of polymeric resin and low density filler particles produced by the present invention contain from 2 to 50 volume percent of the low density filler particles.

While the present invention has been disclosed by reference to specific examples, the scope of the invention is determined by the appended claims.

What is claimed is:

1. A method of coating expanded particulate perlite comprising the steps of:
   (a) coating individual particles of said perlite with an emulsion containing an organosilicon compound that will react to form polydimethylsiloxane;
   (b) drying the coating on said particles to less than 0.5 weight percent moisture while preventing agglomeration of the coated particles to yield a free-flowing particulate; and
   (c) strengthening the coated, dried particles by heating for a time and temperature sufficient to render the coated particles substantially resistant to attrition.

2. The method of claim 1 wherein said coated particulate perlite is rendered attrition resistant by heating said dried, coated perlite for a period of time such that the product of the temperature in degrees Fahrenheit and the time in hours is in the range of from about 140 to 1,100.

3. The method of claim 1 wherein the dried coating is heated in the range of from about 550° to 850° F. for from 10 to 120 minutes.

4. The method of claim 3 wherein the dried coating is heated to a temperature of from 650° to 750° F. for from 10 to 60 minutes.

5. The method of claim 1 wherein said expanded particulate perlite has a particle size distribution in which 85 percent of the particles are between 50 and 200 U.S. Standard mesh.

6. The method of claim 1 wherein the coated particulate perlite is dried in a flowing airstream.

7. The method of claim 1 wherein said unexpanded particulate perlite ore is presized so 98 weight percent of said ore is between −170 and +1250 U.S. Standard Mesh.

8. The method of claim 1 wherein the polydimethylsiloxane has trimethyl end groups.

9. The method of claim 1 wherein said compound is applied as an emulsion.

10. The method of claim 9 wherein said emulsion contains from 3 to 40 weight percent compound.

11. The method of claim 9 wherein said emulsion has a water base.

12. The method of claim 9 wherein the base for said emulsion is selected from the group consisting of alcohol, benzene or kerosene.

13. A method of coating particulate perlite comprising the steps of:
   (a) pre-sizing unexpanded particulate perlite ore;
   (b) expanding said ore by heat treatment to an expanded particulate perlite;
   (c) coating the individual particles of said expanded particulate perlite with a emulsion containing an organosilicon compound that will react to form polydimethylsiloxane to yield a coated particle of from 0.5 to 4.0 weight percent of said compound;
   (d) drying said coating to a moisture content of less than 0.5% in a moving airstream; and
   (e) strengthening said coating by heating the dried, coated perlite particles for a time and temperature sufficient to render the coated perlite particles substantially resistant to attrition.

14. The method of claim 13 wherein said particulate perlite is rendered attrition resistant by heating said dried coated perlite for a time period such that the product of the temperature in degrees Fahrenheit and the time in hours is in the range of from about 140 to 1,100.

15. The method of claim 13 wherein the dried coating is heated at a temperature of from 650° to 750° F. for from about 10 to 60 minutes.

16. The method of claim 13 wherein the dried coating is heated in the range of from about 550° to 850° F. for from 10 to 120 minutes.

17. The method of claim 13 wherein said emulsion has a water base.

* * * * *